US009503919B2

(12) United States Patent
Sofuoglu et al.

(10) Patent No.: US 9,503,919 B2
(45) Date of Patent: Nov. 22, 2016

(54) WIRELESS COMMUNICATION NETWORK USING MULTIPLE KEY PERFORMANCE INDICATORS AND DEVIATIONS THEREFROM

(71) Applicant: P. I. Works TR Bilisim Hizm. San. ve Tic A.S., Pendik, Istanbul (TR)

(72) Inventors: Serkan Sofuoglu, Pleasanton, CA (US); Djakhongir Siradjev, Istanbul (TR)

(73) Assignee: P. I. Works TR Bilisim Hizm. San. Ve Tic A.S., Istanbul (TR)

( * ) Notice: Subject to any disclaimer, the term of this patent is extended or adjusted under 35 U.S.C. 154(b) by 0 days.

(21) Appl. No.: 15/155,650

(22) Filed: May 16, 2016

(65) Prior Publication Data
US 2016/0277946 A1 Sep. 22, 2016

Related U.S. Application Data (63) Continuation-in-part of application No. 14/325,467, filed on Jul. 8, 2014.

(51) Int. Cl.
*H04B 7/00* (2006.01)
*H04W 24/02* (2009.01)
*H04W 28/18* (2009.01)

(52) U.S. Cl.
CPC ............ *H04W 24/02* (2013.01); *H04W 28/18* (2013.01)

(58) Field of Classification Search
CPC ............... H04W 16/00; H04W 16/24–16/32; H04W 52/00
USPC .................................. 370/310–350
See application file for complete search history.

(56) References Cited

U.S. PATENT DOCUMENTS

| 7,577,103 | B2 | 8/2009 | Diaz et al. |
| 2005/0064820 | A1 | 3/2005 | Park et al. |
| 2006/0063521 | A1 | 3/2006 | Cheung et al. |
| 2007/0002759 | A1 | 1/2007 | Diaz et al. |
| 2007/0026810 | A1 | 2/2007 | Love et al. |
| 2007/0213070 | A1* | 9/2007 | Kim ...................... H04L 1/0003 455/452.2 |
| 2011/0151881 | A1 | 6/2011 | Chou et al. |
| 2011/0294527 | A1 | 12/2011 | Brueck et al. |
| 2012/0115423 | A1* | 5/2012 | Sang ................... H04L 27/2657 455/75 |
| 2012/0282933 | A1 | 11/2012 | Hofstaedter et al. |

(Continued)

OTHER PUBLICATIONS

Schmelz et al., "A Coordination Framework for Self-Organisation in LTE Networks", 12th IFIP/IEEE International Symposium on Integrated Network Management, 2011, p. 193-200, IEEE.

(Continued)

*Primary Examiner* — Andrew Chriss
*Assistant Examiner* — Kenan Cehic
(74) *Attorney, Agent, or Firm* — Intrinsic Law Corp.; Ibrahim M. Hallaj (57) ABSTRACT

A system and method for dynamically improving or optimizing the performance and robustness of a wireless communication network such as a mobile communication system or cellular telephony network are disclosed. In some aspects, a plurality of time and space dependent key performance indicators (KPI) are used as part of a statistical determination of a pattern and schedule for optimizing the design, configuration and operation of the network. By dynamically applying a method of multiple KPI deviations (MKD) the system and method improves handover execution in cellular or similar systems and reduces radio link failures and improves overall subscriber service quality.

4 Claims, 5 Drawing Sheets

(56) References Cited

U.S. PATENT DOCUMENTS

2012/0322438 A1 12/2012 Bader
2013/0143561 A1 6/2013 Nuss et al.

OTHER PUBLICATIONS

Koutsouris et al., "Conflict free coordination of SON functions in a Unified Management Framework—Demonstration of a proof of concept prototyping platform", IFIP/IEEE International Symposium on Integrated Network Management: Demonstration Session Paper, 2013, p. 1092-1093, IEEE.
Bandh et al., "Policy-based Coordination and Management of SON Functions", 12th IFIP/IEEE IM: Application Session, 2011, p. 827-840, IEEE.
3GPP, "ETSI TS 133 500 Technical Specification", Feb. 2010, version 9.0.0, release 9, ETSI.
3GPP, "ETSI TR 136 902 Technical Specification", May 2011, version 9.3.1, release 9, ETSI.

\* cited by examiner

| | | | | Multiple KPIs | | | | | |
|---|---|---|---|---|---|---|---|---|---|
| | ERAB % Retainability | HO Exec Succ Rate - Intra Freq | RLF per Handover Att | Call Setup Success Rate | DL Thput/User [kbps] | Oscillation per Handover Att | Handover Attempt - IntraFreq | MKD per Cell | Rollback decision (if MKD < -5) |
| Object | Cell | Cell | Cell | Cell | Cell | Cell | Cell | | |
| Period | P1 | P1 | P1 | P1 | P1 | P1 | P1 | | |
| KPI Name | ERab%Retain | HoExe%Succ | Ho%RLF | CSSR | ErlaputUserDL | Ho%Osc | HoExeAttIntraF | | |
| OverallWeight | 1 | 1 | 0.1665 | 0.1665 | 0.5 | 0.2 | 0.2 | | |
| worse MKD if KPI value | decrease | decrease | increase | decrease | decrease | increase | increase | | |
| KpiDir | 1 | 1 | -1 | 1 | 1 | -1 | -1 | | |
| P1Avg[D1-D5] | 0.9994 | 0.9921 | 0.3093 | 0.9993 | 13100 | 0.0169 | 100 | | |
| P1Stdev[D1-D5] | 0.0003 | 0.0086 | 0.3942 | 0.0002 | 1169 | 0.0092 | 100 | | |
| CurrentValue | 0.9995 | 0.993 | 0.1976 | 0.9993 | 14110 | 0.02 | 300 | | |
| RawKpiDev | 0.500 | 0.102 | -0.283 | 0.000 | 0.911 | 0.337 | 2.000 | | |
| NormKpiDev = (RawKpiDev * KpiDir) | 0.500 | 0.102 | 0.283 | 0.000 | 0.911 | -0.337 | -2.000 | | |
| KD = FinalKpiDev = (NormKpiDev * OverallWeight) | 0.500 | 0.102 | 0.047 | 0.000 | 0.456 | -0.067 | -0.400 | | |
| MKD = Multiple KPI Deviation | | | | | | | | 0.63767 | NO |

Fig. 5

WIRELESS COMMUNICATION NETWORK USING MULTIPLE KEY PERFORMANCE INDICATORS AND DEVIATIONS THEREFROM

RELATED APPLICATIONS

This application claims priority to and is a continuation in part of U.S. application Ser. No. 14/325,467, filed on Jul. 8, 2014, entitled "Wireless Communication Network Performance and Robustness Tuning and Optimization Using Deviations in Multiple Key Performance Indicators," which is hereby incorporated by reference.

TECHNICAL FIELD

The present disclosure generally relates to the field of wireless communication networks. More specifically, it relates to dynamically improving or optimizing the performance and robustness of such networks using a plurality of key performance indicators (KPI) as well as data gathering and statistical techniques to analyze multiple KPI deviations (MKD).

BACKGROUND

Implementing wireless communication networks in real life environments is typically a challenging and complex undertaking. The complexities of such networks arise from numerous factors. One set of factors includes the physical communication channels in the presence of urban structures, natural terrain, atmospheric variations and other environmental factors. Another set of factors arises from the engineering systems needed to support wireless communications over useful ranges, which includes the antenna designs and placements, communication base station hardware and software, wired communication infrastructure, switching and other maintenance and upkeep factors. Yet another set of factors arises from the mobile wireless devices and their sheer numbers in some areas, each requiring real-time and acceptable quality of service around the clock. Taken together, the infrastructure and devices and techniques used to interconnect the parts of the system can be referred to as a mobile communication system (sometimes "MCS"). A primary goal of MCS system designers and operators is to implement and operate the MCS system in the most reliable, robust and efficient manner so as to serve the largest number of customers with the highest level of quality at a most cost effective rate.

One example of MCS is cellular telephone communication systems and networks, which vary from region to region but share physical and design and performance features. These systems generally include a network of base stations including telephony processors and servers coupled to physical antenna installations. The antenna installations permit over the air wireless communication with suitably equipped and subscribing customers. In most or all cases, a mobile communication device can continue a communication session even when traversing from one cell of the cellular network to another using established handover methods. A well designed and operated cellular system offers consistent good quality communication with few communication problems (dropped calls) or disruptions due to handover events, interference, fading or other noise generating factors. The settings of various controlling parameters in mobile communication systems (MCS) significantly affect various dimensions of performance of mobile devices, which are connected to and utilize the services provided by the MCS. In the prior art MCS and prior art standards and practices used to govern the MCS, improvements to such performance of mobile devices under conditions of mobility are referred to as "mobility robustness" improvements, which seek to improve the success rates of handover of the mobile device from one cell to another in the MCS and eventually improve drop call rates.

Base Stations are network elements to which mobile user devices are connected in the MCS using radio channels. Handover is a mechanism of the MCS whereby a user mobile device is assigned different serving Base Stations to connect to as the mobile user devices move around the coverage areas of a MCS. Due to high number of relations defined in a typical MCS, manual setting of handover (HO) parameters in current 2G/3G/4G systems is considered too costly and time consuming task. In scenarios where manual configuration is done, incorrect or unoptimized HO parameter settings negatively affect user experience and waste network resources by causing HO ping-pongs, HO failures, and radio link failures (RLF). While HO failures that do not lead to radio link failures (RLF) are often recoverable and transparent to the user, RLFs caused by incorrect HO parameter settings have a combined impact on user experience and on the availability of network resources.

A number of metrics are defined to characterize the performance or robustness of a MCS. The metrics are referred to as Key Performance Indicators (KPI). However, merely defining such metrics does not help improve the performance and robustness of networks, especially in dynamic conditions that are subject to time variation. The art lacks well-studied and reliable ways to predict and account for such dynamic network conditions. There have been various attempts to provide solutions to achieving maximum performance efficiency of the MCS.

US-2005/0064820 purports to disclose analyzing of a wired/wireless network and to optimize performance of the network by gathering data continuously from elements constituting a wired or wireless network to find an element of which performance and efficiency deteriorates. An optimal plan to resolve low performance is chosen through data analysis.

US-2007/0002759 purports to disclose a method for monitoring system conditions for time periods within a periodic time interval within which network parameters for optimizing a wireless may be determined.

US-2013/0143561 purports to disclose a computing platform provided to enable optimizing a cellular network by gathering data, retrieve statistical KPIs from a plurality of network elements, generate a predictive Key Performance Indicator by correlating information from the network elements and retrieved KPIs, and trigger changes to the cellular network based on the predicted trend.

US-2006/0063521 purports to disclose system monitoring and fault detection capable of detecting a sleeping cell, for example, by determining a deviation between actual cell performance and an expected cell performance.

US-2007/0026810 purports to disclose a wireless communication terminal that communicates on a plurality of sub-carriers divided into a plurality of frequency bands, wherein each frequency band includes at least one sub-carrier. The terminal measures a channel quality indicator (CQI) for a plurality of frequency bands, identifies a subset of frequency bands for which the channel quality indicator has been measured based on a subset criterion, and transmits a report identifying a subset of frequency bands for which a channel quality indicator has been measured or frequency bands not in the subset.

US-2011/0151881 purports to disclose methods and systems for fractional frequency reuse in wireless networks. A reuse factor of one (f=1) may be used to serve mobile stations located in inner cell regions that do not experience significant inter-cell interference (ICI) and a reuse factor of less than one (f<1) may be used for mobile stations located near the cell edge that tend to experience higher levels of ICI. Dynamic allocation of frequency partitions and adjustment of power levels for each base station sector are provided in order to avoid collisions between neighboring base station sectors and achieve improved capacity and performance. Load balancing may also be provided.

US-2011/0294527 purports to disclose a system that varies parameters in order to optimize wireless performance of cellular networks. The system is based on extended ANR (Automatic cell Neighbor relations) functionality as a means for generating cluster information in an electronic device and to transmit clustering information to one or more base stations. The disclosure emphasizes interference reduction techniques and the need for (dynamic) clustering of wireless network entities.

US-2012/0115423 purports to disclose a method that varies parameters in order to optimize wireless performance of cellular networks. It shows a frequency deviation pre-calibration method comprising estimating an uplink frequency deviation value of a user equipment and acquiring a historical uplink frequency deviation pre-calibration value, determining from the historical uplink frequency deviation pre-calibration value a current uplink frequency deviation pre-calibration value of the user equipment which is closer to the estimated uplink frequency deviation value than the historical uplink frequency deviation pre-calibration value and performing frequency deviation pre-calibration on the user equipment with the current uplink frequency deviation pre-calibration value.

US-2012/0282933 purports to disclose a controller coupled to a mobile communications environment including at least one of a public and a private network and method of controlling a mobile device in the mobile communications environment. The controller includes a receiver that receives data about network operating parameters at specific locations within the at least one of a public and private network, a processor that evaluates the data about the network operating parameters at the specific locations based upon rules for the mobile device, and a transmitter that sends advisories to a mobile device located within a predetermined proximity to one of the specific locations about the network operating parameters.

US-2012/0322438 purports to disclose an Operating Support System for Performance Management of a mobile telecommunications system comprising a plurality of nodes and radio access units servicing a plurality of cells generating a plurality of operational events data and counter values measured periodically for a first Result Output Period, ROP. Events data and counter values originating from the nodes and radio access units are collected, aggregated periodically for a second and further ROPs having a duration longer than the first ROP. From the collected events data further counter values are created periodically for the second and further ROPs. The aggregated and further counter values are processed corresponding to the originating nodes, radio access units and ROP, and the processed counter values are analyzed for providing system operational performance indicia in different time scales.

Prior art solutions do not provide an adequate solution to the problem of optimization of the MCS on the dimension of mobility performance while at the same time allowing maximum improvements to be achieved to other measures of network performance such as data transfer efficiency.

SUMMARY

An objective of mobility robustness optimization (MRO) is reducing the number of handover (HO) related radio link failures (RLF). Furthermore, non-optimal configuration of handover parameters, even if it does not result in RLFs, may lead to serious degradation of the service performance. An example of such a situation is incorrect setting of the HO offset parameter, which may cause a ping-pong effect (bouncing rapidly between connections with different neighboring Base Stations) or prolonged connection to a non-optimal cell. Another objective is the reduction of the inefficient use of network resources due to unnecessary or missed handovers, which can result from failures due to too late HO triggering, too early HO triggering, and/or HO to an incorrect cell.

Accordingly, aspects of this invention are directed to using certain mobility parameters that are monitored and modified to optimize or improve the performance of wireless communication services in a computerized MCS. Configuration parameters are selected, changed, and the impact of such changes on multiple key performance indicators (KPI) are monitored according to a particular pattern and schedule, using the mechanism of multiple KPI deviations (MKD). A well-defined set of mobility robustness optimization (MRO) changes are applied on selected badly performing regions of the MCS for a specified period of time with the goal of improving handover execution success by reducing radio link failures and with controlled impact on specific services (in an example, down-link data throughput). Results can then be evaluated to find the optimum set of changes to achieve performance improvements of the steady-state behavior of the MCS.

In an aspect of this invention, configuration parameters may be composed of cell-level parameters (e.g. handover parameter offsets, hysteresis, thresholds, time-to-trigger values) and/or cell relational level parameters (e.g. cell individual offsets, idle mode reselection offsets) as specified in prior art MCS standardization group (i.e., the 3GPP Organization) Specifications. (e.g., 3GPP TS 28.628 clause 4.3.2). A "Solution set" refers to one or a combination of configuration parameters. "Rollback" refers to changing back the set of configuration parameters to previous values that were set before the changes were applied In an aspect, the present concepts can be applied, for example, but not only, to multi-technology MCS (e.g., Third Generation and Fourth Generation MCS) using a closed-loop optimization processor to improve numerous operating parameters such as downlink data throughput, handover success rates, and other factors.

BRIEF DESCRIPTION OF THE DRAWINGS

For a fuller understanding of the nature and advantages of the present concepts, reference is made to the following detailed description of preferred embodiments and in connection with the accompanying drawings, in which.

DETAILED DESCRIPTION

The operator of the MCS is continually seeking new techniques for running their dynamic and complex networks at maximum efficiency. Performance optimization techniques are employed to make systematic changes to performance-affecting parameters stored in the network in order to ensure the best possible performance for users of the various services provided by the operator, such as mobility performance of users and data transfer speeds. Indicators (e.g., KPI) are used to determine whether such optimization is needed for parts of the network. These indicators are typically referred to as KPI, which can take the form of formulae composed of performance measurements combined in certain ways to better show the quality of various services along various dimensions of performance. The underlying factors of each KPI are stored in the operational support system (OSS, e.g., OSS 120 in FIG. 1) processor managed by the MCS operator. Optimization processes collect the appropriate KPI data, combine this measurement data into formulae, and evaluate the formulae according to a certain schedule to determine whether the certain network services are operating at maximum efficiency. Changes to the performance-affecting parameters will change the value of the KPI. There are typically many KPI used to determine quality levels of the network. These performance-affecting parameters interact with each other in complex ways and impact the KPI in complex ways. The optimization problem can be defined as a set of techniques to change performance-affecting parameters to achieve desired results of improving certain dimensions of performance of the MCS.

One problem addressed by embodiments of the systems and methods disclosed herein is to make use of a multiple KPI evaluation on a baseline trend. In particular, dynamic calculation of deviation in terms of multiple KPIs in comparison with a baseline data set may be realized according to embodiments of systems and methods herein rather than static or pre-defined thresholds per KPI without any adaptation to the network situation.

The prior art, such as the references described in the Background, do not provide adequate solutions to problems such as addressed by aspects of the present invention for an automatic mechanism to optimize the performance of the MCS on the dimension of mobility performance, while at the same time allowing maximum improvements to be achieved to other measures of network performance such as data transfer efficiency.

It should be noted that well-defined target KPIs such as Handover Failures, Attempts, etc. may be used by MRO implementations as described in prior art in the 3GPP, MCS standardization specifications (e.g. 3GPP TS 28.628 clause 4.3.1). However, with the targets defined in this prior art, MRO has no knowledge about scenarios that negatively affect KPIs out of the scope of the MRO. In an example, reduction of mobility drops may be experienced as a result of slowing down handovers at the expense of degraded data throughput performance due to keeping users more in non-favorable radio conditions. Hence, in one embodiment of the present invention, the method extends the evaluation to include multiple KPI that include both MRO-specific and general KPI of interest such as data throughput performance, accessibility of the mobile device to the WCS, and/or retainability of the mobile user session without disruption.

Figure 1:
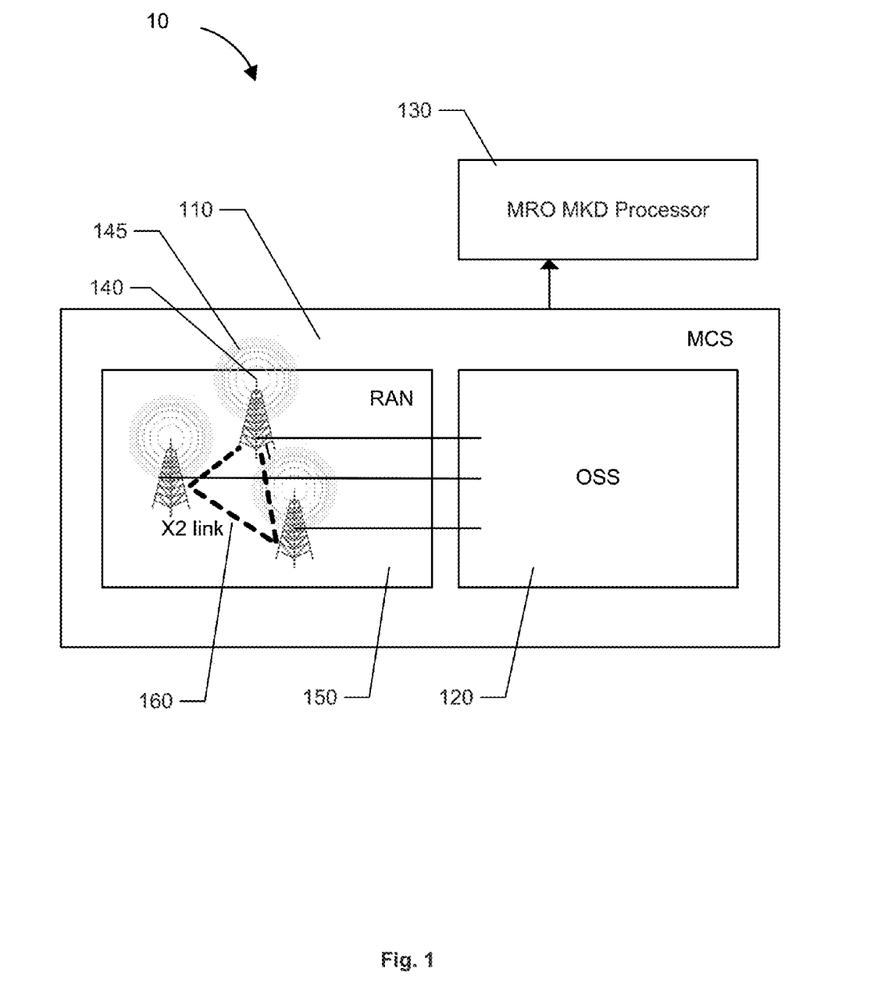
FIG. 1 schematically illustrates a MRO MKD according to an embodiment; configuration; showing the Radio Access Network entities (RAN) connected to the Operational support system containing MCS configuration parameters and real-time metrics gathered by and about the MCS. The MRO MKD processor is the locus of one embodiment of the present method disclosed herein.

FIG. 1 schematically illustrates a MRO MKD system 10 according to one configuration. The system 10 includes a MRO MKD processor 130, which autonomously and dynamically executes programmed operations and instructions according to the design of the multiple KPI optimization system in certain embodiments disclosed herein. The operational support system (OSS) 120 contains data regarding the performance and configuration of the MCS 110. Base station node 140 generates cellular signals 145 that permit communication between mobile units (e.g., cellular mobile telephone subscriber devices) and the wider telephony network. These nodes are sometimes called "NodeB" for Third Generation MCS or "eNodeB" for Fourth Generation MCS. The base station nodes 140 collectively define a radio access network (RAN) 150. A communications link 160, such as an X2 link (e.g., in 4G LTE), can be formed between neighboring base station nodes 140.

In a further embodiment of the current invention, area selection and special cell exclusion can be performed. In an example, exclusions based on a site list used by important subscribers on the MCS, indoor sites, venue specific sites, sites bordering on the targeted area of interest, etc. can be excluded or as specified by the MCS operator as in an imported list.

The general operation and function of the system can be understood by analyzing multi-dimensional plots having axes representing the configuration parameters of the system, e.g., time-to-trigger, hysteresis, call drop KPI, handover failures, and other parameters. Generally, each KPI has its own dependence on the values of the configuration parameters employed by the system. This technique for analyzing, statistically understanding, and controlling for the various configurations so as to control the KPI in a dynamic fashion is an aspect of the present invention.

Call drop ratio can be determined as a function of time-to-trigger and hysteresis (dB) in a MCS. Also handover failure ratio can be determined as a function of time-to-trigger and hysteresis according to some embodiments. Such failure ratios can be taken into consideration in optimizing the design and performance of the present system and method.

Figure 2:
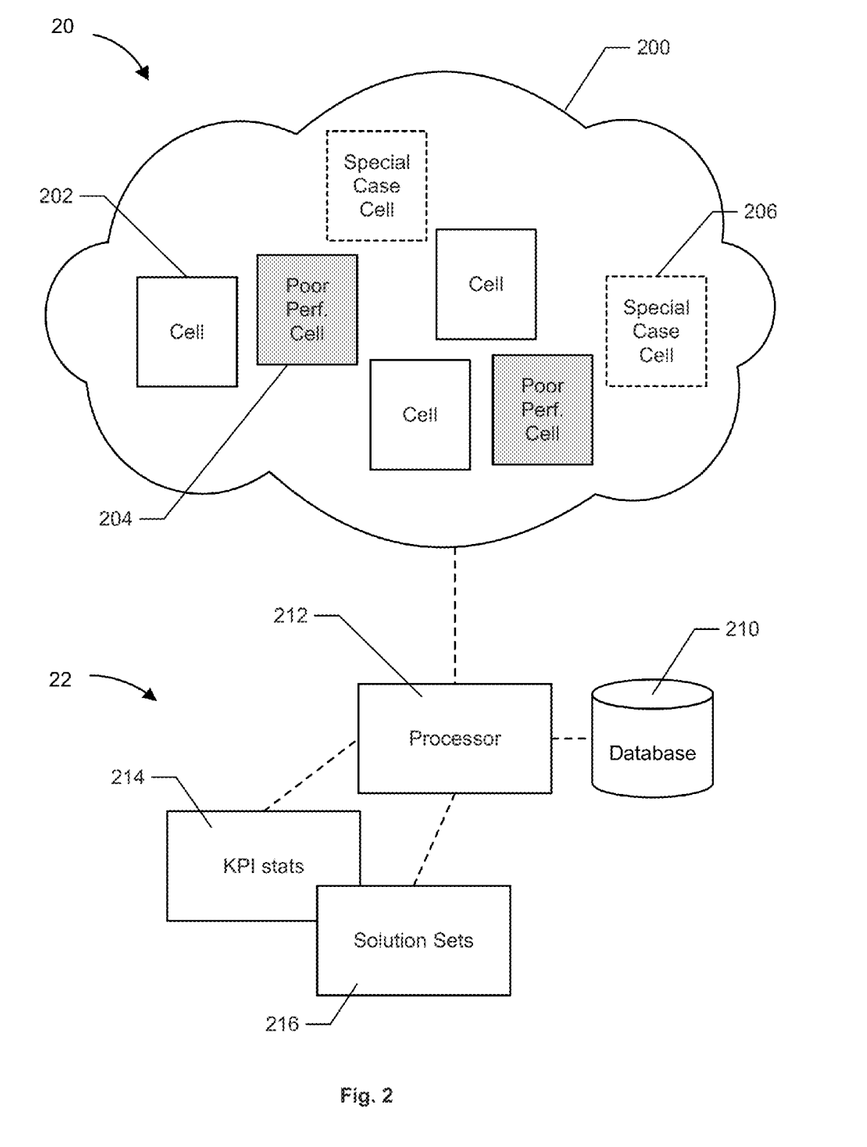
FIG. 2 illustrates an exemplary architecture and system for carrying out the present method; showing schematic elements of the method and system described herein.

FIG. 2 illustrates an architecture showing a MCS 20 including a plurality of cells (and relations between the cells, or cell relations) in a network 200. The cells include test cells in a target area, poorly performing or worst performing cells, and special case cells to be excluded (202, 204, and 206, respectively). The cells are monitored by and exchange data with a system 22 including one or more computer processors (desktop computers, workstations, signal processors, etc.) 212 and one or more data stores or databases 210. The system 22 also includes one or more modules, engines, or instruction processing elements for calculating solution sets 216 and KPI statistics, deviations and other parameters and metrics 214.

In an aspect, Multiple KPI Deviations (MKD) during optimization of the system and dynamically and iteratively tracking this parameter space is a valuable feature of the present system and method. By assigning appropriate values to the relevant parameters, which can vary in space and time, the MRO MKD processor can tune the behavior of the system for optimum performance and robustness. Ways of using the present MKD method as implemented in its systems include identifying best cost value per cell-period after each configuration parameter change applied, and establishing a reference for parameter rollback decision on the cell level after a certain observation period of time.

Figure 3:
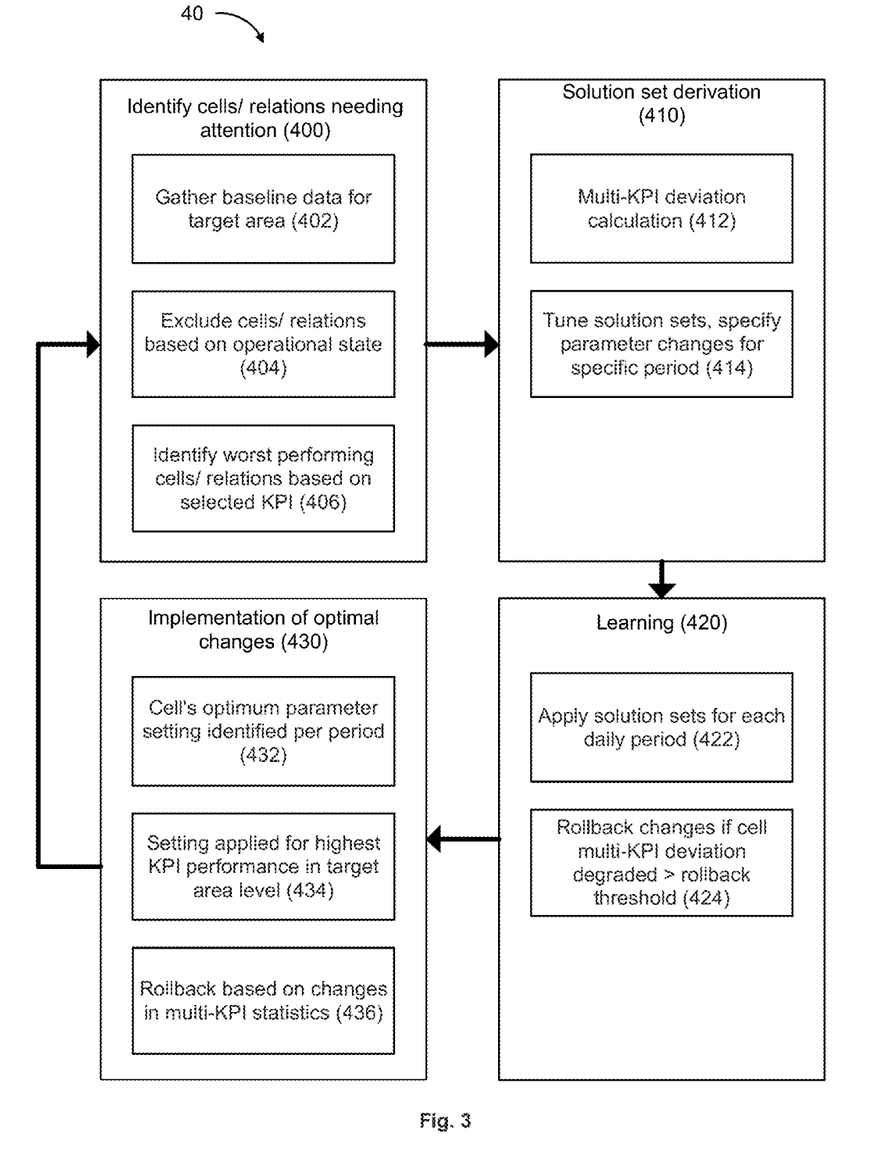
FIG. 3 illustrates a process for monitoring, learning and applying optimum solution sets to multiple KPI in a MCS.

FIG. 3 illustrates an exemplary flow diagram or method 40 according to one or more embodiments. The process may be divided into four main groups of steps, but this is not limiting, as those skilled in the art would appreciate ways to define the process or organize the steps of the method that are equivalent or differ in ways still comprehended by the present disclosure and invention. Here, the main groups of steps are organized for ease of understanding into: identifying cells or relations needing attention 400; solution set derivation 410; learning 420; and implementation of optimal changes 430; after which the method can be repeated as shown.

In the steps for identifying cells or relations needing attention 400, we can define steps to gather baseline data for a target area 402; exclude cells or relations between cells based on operational state 404; and identify worst performing cells or relations between cells based on selected KPI (generally a plurality of selected KPI) 406. In one embodiment, the system and method can distinguish and then exclude or fix operational problems that may interfere with the problem that is being addressed after gathering the baseline data for the target area. For example, problems due to physical cell identity (PCI) conflicts, where the same identifier is assigned to more than one cell in the area, termination point problems on the X2 link for $4^{th}$ generation MCS (e.g., communications link 160), which needs to be reset, problems due to distant bad performing relations being added automatically by equipment ANR functions, and other possible cases. This allows for filtering and elimination of cells or relations that are the victims of such common operational problems.

A specific rule per use case can be used to identify problematic or non-optimum working areas where the above mentioned operational problems are identified, fixed or excluded. Embodiments of the MRO MKD system can minimize handover related radio link failures that happen due to too late handover, too early handover, and handover to wrong cell scenarios, while at the same time preventing ping-pong and unnecessary handovers.

In an embodiment of the present system, the MRO may have its own set of worst cell/relation selection rules among planned base stations area and related buffer area. The MRO MKD processor can target cells with the highest mobility characteristics and with desired minimum target quality index (quality indicator KPI) levels for best results. The MRO is also applied to the worst relations, which are filtered. Measurement period data is used for the planned area and buffer area. In one aspect, the planned area in the form of worst relations will not normally be changed during the learning period where candidate solution sets are applied to network, which could for example be a week long. In practice, during the learning week, the optimization area will show changes due to different cells or cell relations satisfying criteria or filtering thresholds, with new problematic relations arising. These additions and deletions are not usually of the order that would affect the overall results. These new cells and relations however will be taken care of in the following iterations because they will become part of the worst area in the next iteration of MRO MKD set of calculations.

One aspect therefore includes a computer system that improves the performance of a Mobile Communication System (MCS) in a multi-cell network, including a processor of said computer system, in communication with the MCS; a wireless communication signal receiver that gathers baseline wireless communication signal data for a target area, disposed in areas containing wireless communication cells or wireless communication cell relations of said MCS for which wireless communication cell or wireless communication cell relation performance characteristics are to be extracted based on a plurality of key performance indicators (KPI); a computer-readable database, in data communication with said processor, that stores baseline data received by said receiver; a solution engine implemented in said processor and configured and arranged to execute instructions that seed the target area by applying a first solution set to a first wireless communication cell and a second solution set to a second wireless communication cell; said computer system further configured and arranged to detect at least one performance metric for said first and second wireless communication cells using said wireless communication signal receiver; said computer system further configured and arranged to store data representing said at least one performance metric for said first and second wireless communication cells in said database; said processor configured and arranged to calculate a unified performance metric for said first wireless communication cell and for said wireless communication second cell, the unified performance metric calculated by (a) calculating respective KD values for each of said at least one performance metric for said first wireless communication cell and for said second wireless communication cell and (b) calculating a MKD value for said first wireless communication cell and for said second wireless communication cell, said MKD value comprising a sum of said respective KD values for said respective first or second wireless communication cells; said processor configured and arranged to identify a maximum MKD value and a corresponding wireless communication cell; said processor configured and arranged to apply the solution set of the corresponding cell to the other wireless communication cell; and said processor configured and arranged to generate cellular signals from a respective base station in the first and second wireless communication cells using the solution set of the corresponding wireless communication cell.

The processor and the processing engines (e.g., a solution engine, a calculating processor circuit; a signal receiver and sensor) may be implemented as best suits a particular application. For example, a general purpose processing circuit (e.g., an integrated circuit, etc.) or a specialty processor (e.g., graphics processor, GPU, ASIC, etc.) may be adapted for the present purpose. The method herein can be used to improve the performance or the operation or to enable such processor to accomplish the present purpose, which may be impractical or impossible using prior systems and software.

Instructions, stored in machine-readable media can be adapted for execution in said processor(s) so as to render the same configured and arranged for the present application.

Still referring to FIG. 3, in the steps for derivation of a solution set 410, we can define steps to calculate multiple KPI deviation 412 and to tune solution sets, and specify parameter changes for the specific period 414. A notable aspect of the present system and method is that solution sets can be derived for a MCS using multiple KPI and changes in said multiple KPI metrics to identify best solution sets. In an aspect, the solution set derivation is dynamic and time variable, in an example, over defined time periods in a day or other periodicity. In another aspect, the solution set derivation can be local in nature, at the cell level in a cellular system, and therefore have global performance and robustness implications.

It has been suggested above that the present method and system can be automated, which in some embodiments can employ techniques of machine or assisted learning, artificial intelligence techniques, or other helpful automation and optimization strategies. In the steps for learning 420, we can define steps to apply solution sets for each daily period 422, which is generalized to any periodicity that is sensible for a given application; and rollback changes if a cell multiple KPI deviation is degraded more than a rollback threshold 424. A well-defined set of optimization changes can be applied on selected worst region for a specified period of time. Results can then be evaluated to find the optimum set to be applied on cell/relation level.

In an aspect, the present system and method can find and tune solution sets iteratively, possibly holding the permanent introduction of the found solution sets into the operation of the MCS until the following stage of the process. In this way, the operator and/or system can 'watch' for the impact of the updated solution sets on the system and decide if and when to implement the same on a permanent basis.

In the steps of the present method 40 for the implementation of optimal changes 430, we define steps to identify a cell's optimum parameter setting level identified per period 432; applying the setting for highest KPI performance in the target area 434; and rollback based on changes in multiple KPI statistics 436. In an aspect, the results of the learning process above can be implemented into the daily operation of the MCS after the operator or system is satisfied with the revised solution sets. This may include a statistical study of the actual or predicted impact of such solution sets on the multiple KPI in use.

In another embodiment, the steps above can be combined or further divided into sub-processes as suits a given application, and some simplification and generalization is inevitable for the sake of disclosure. Nonetheless, those skilled in the art would appreciate a number of aspects of the present disclosure and exemplary embodiments. In an aspect, it is understood that the above steps could be carried out fully or partially automatically in or by a machine such as a computer or processing apparatus. Typically, such a machine would have circuitry and carry or be adapted to execute stored machine-readable instructions (sometimes encoded into transitory or non-transitory data storage and memory units). In addition to processing and data storage capability, the machine would also typically be equipped with network communication functionality such as input/output ports for receiving and sending electronic signals over such a network. In some aspects, the Internet could be such a network. In other aspects, a wired or wireless telephony network could be connected thereto.

In further embodiments of the present invention, a user interface may be included in the system so that human users or computer interfaces can provide and receive information exchanged with the system described here. The user interface can include visual and/or audible outputs indicative of relevant information being presented by the system. Graphical depictions of the performance and robustness of the system or MCS it is monitoring and controlling can be displayed and actions can be taken in response thereto. Also, alarm units signaling some pre-determined condition or programmed alarm criterion can be included in the hardware or software of the system. A database unit can be included with or be accessible to the system in which data is stored such as detailed measurement results, data tracking performance and robustness, and other data that can be used for future learning or programming of the system.

Figure 4:
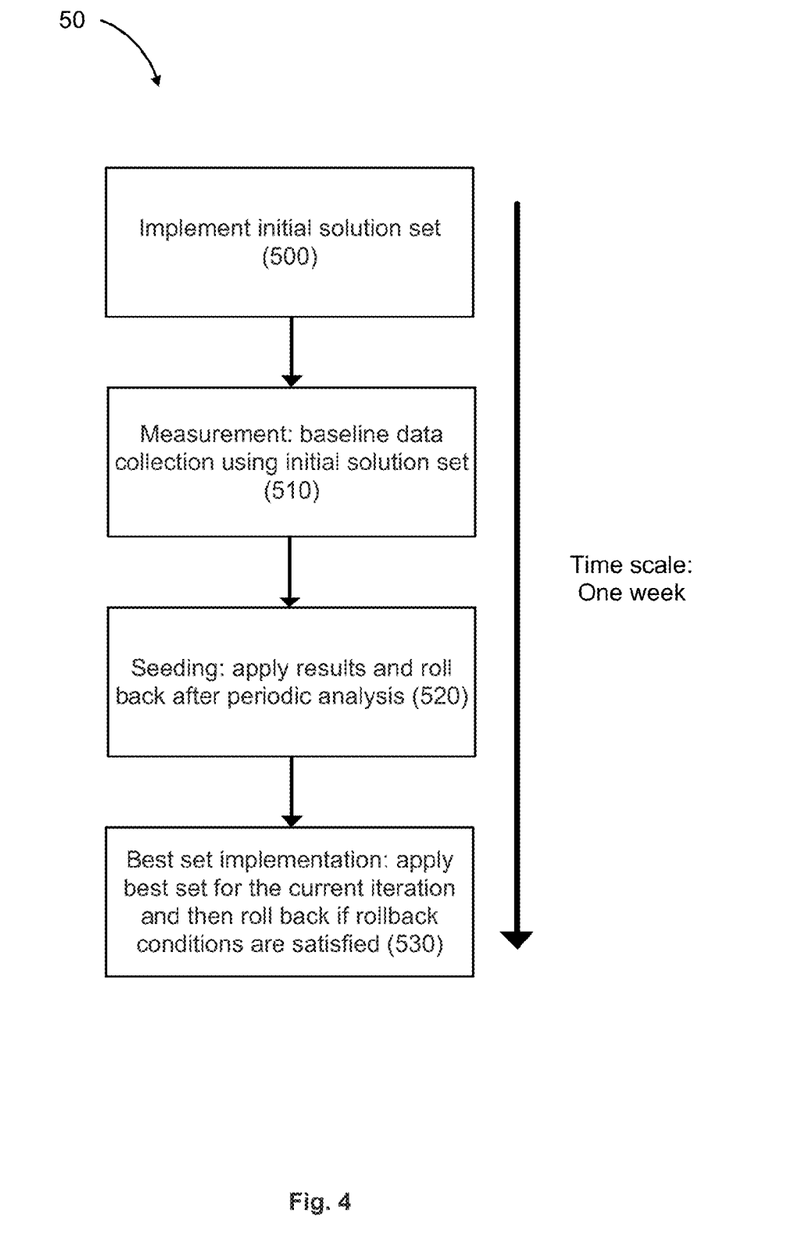
FIG. 4 illustrates exemplary phases of MRO MKD operation and exemplary timeframe of operation of an embodiment of the method described herein.

FIG. 4 illustrates an exemplary and simplified flow diagram 50 of the phases of operating the present MRO MKD system and method in a MCS. The process depicted can have a total time frame of about one week in an embodiment.

In phase 500 we implement the initial solution set or a default set. A solution set herein is a combination of one or more configuration parameter settings. The implementation of the parameter settings is again intended to improve overall user and operator experience and quality. This can be based on evaluation of a number of KPI and the solution sets therefore being based on conditions that are satisfied. The conditions can be built-in from prior knowledge from experience and measurements in the field. The implementation includes generating cellular signals from the base station nodes using the initial solution set or default set. The cellular signals allow for wireless communication between mobile units (e.g., cellular mobile telephone subscriber devices) and the wider telephony network.

In phase 510 we make measurements, collecting baseline data, still using the initial solution set. Statistical information for baseline in a typical cellular MCS can be acquired over a month or so of observation (but this is a general statement and good data can be accumulated in two weeks, in most cases). Measurements are done using cellular and relational performance management data with some minimum resolution for the planned area and buffer area that are collected and stored in this phase.

In an example, each day is divided into three periods: a morning period (P1) from midnight until 8 a.m., a daytime period (P2) from 8 a.m. until 4 p.m., and an evening period (P3) from 4 p.m. until midnight. Of course other periods may also be defined. Data is collected and measurements made in the system, then analysis and calculations are performed on data measured from each of the periods of the day. The data can be organized and labeled, for example, referring to "P1W1D1" at Period P1 of Week 1 and Day 1, and so on.

In some aspects, data can be excluded from outlying or special times, days or events so as to avoid contaminating the normal data collection and analysis with data from statistical outliers.

In phase 520 the system is seeded by applying any determined solution set results and rolling back any changes after an hourly analysis of the performance of the system (or any other convenient periodicity). In phase 530 we apply the best solution set for a current iteration and then roll back the parameters after hourly analysis (or any other periodicity), if the rollback conditions are satisfied.

The three daily period system described above can be used for seeding the system. Again, the period count and duration are configurable and only exemplary. For a day period, solution sets can be applied for different periods taking into account weekday and weekend days as having different behaviors in some cases. In one scenario, weekend days may be returned to the initial solution sets while solution sets are applied during weekdays. Seeding may extend from one to two weeks in some embodiments. The following table (Table I) shows an example of the seeding process over five days (D) having three periods (P) each, wherein sample seeding is done using two solution sets (SS) in a one week period applied in MRO worst areas.

TABLE I

|    | D1   | D2   | D3   | D4   | D5   |
|----|------|------|------|------|------|
| P1 | SS01 | SS01 | SS02 | SS02 | SS01 |
| P2 | SS01 | SS01 | SS02 | SS02 | SS01 |
| P3 | SS01 | SS01 | SS02 | SS02 | SS01 |

The following table (Table II) shows sample seeding for four solution sets in one week period applied to MRO in worst areas. In an embodiment, the solution sets can be returned to the initial or default set at the end of the weekday.

TABLE II

|    | D1   | D2   | D3   | D4   | D5   |
|----|------|------|------|------|------|
| P1 | SS01 | SS02 | SS03 | SS04 | SS01 |
| P2 | SS01 | SS02 | SS03 | SS04 | SS01 |
| P3 | SS01 | SS02 | SS03 | SS04 | SS01 |

Rollback triggers can be in effect to avoid adverse effects to network KPI. If after applying a solution set the cell MKD degraded by more than a rollback threshold amount (e.g., 3*delta) for some defined increment delta, this solution set can be rolled back and reverts to the reference set within the next hour or next period.

The present system and method are capable of determining a best solution set implementation. Optimum parameter settings are identified for each period and applied to the MCS, resulting in best KPI performance on a regional level. The best solution set value is applied for a weekday or weekend configuration. The following table (Table III) shows an example of identification of a best multiple KPI deviation at the end of a seeding phase of operation. The underlined solution sets show the best MKD solution set and day/period combinations.

TABLE III

| Cell 1 | D1   | D2   | D3   | D4   | D5   | Best MKD |
|--------|------|------|------|------|------|----------|
| P1     | SS01 | SS02 | _SS03_ | SS01 | SS02 | _SS03_ |
| P2     | SS01 | SS02 | SS03 | _SS01_ | SS02 | _SS01_ |
| P3     | SS01 | _SS02_ | SS03 | SS01 | SS02 | _SS02_ |

In some embodiments, cell or relation based rollbacks may be applied only for the day the best solution set is applied (e.g., Monday). After Monday, region-based MKD evaluation can be set and a warning report can be generated in case region-based KPI degrade by more than a rollback threshold. (e.g., some 5*delta_standard_region). Of course, the specific examples above are only for the sake of illustration and are not limiting.

Therefore, the present system and method have a number of inventive features, some or all of which can improve the performance and robustness of a MCS in various embodiments. The MCS may collect and analyze and use system parameter and configuration information to optimize the performance and robustness of the MCS. The system may learn by statistical observation and iterative determination of best solution sets and then apply solution sets found to best affect the MCS at a cell level and in a dynamic fashion based on time periods of the day (or other period). Changes may be rolled back if certain criteria are not met by the changes. In one embodiment, this may be applied in hardware and/or software so that it forms an automated closed-loop means for determining an optimum set of conditions for operating a MCS to increase the quality of the network, reduce dropped calls, improve handover behavior, and other advantages.

In a certain embodiment of the present invention, the system and method can be deployed as stated using a multiple KPI deviation (MKD) method of calculation. A cost function can be computed in some embodiments to minimize handover (HO) failure rates due to "ping-ponging" of a unit, excessively early or too late handover, or handover to a wrong cell. This can be implemented for handover success rate KPI improvements. For any day (D) and period (P) of the day we can define KPI directed to such improvements, presented as exemplary KPI, whereas one of skill in the art can appreciate other such KPI:

P1AvgW1WN signifies P1 average for Week1 to WeekN; and

P1StdevW1WN signifies P1 standard deviation for Week1 to WeekN.

Embodiments of the present MKD method may include identifying best cost value per period. In an example, Cell A has a best benefit when the corresponding parameter is applied to it during period P1 in a week. In another example, the MKD method is applied for establishing a reference for rollback decisions made on a cell or relation level after some evaluation time interval (for example 60 minutes). More specifically, a rollback to a reference base parameter configuration may happen after applying a solution set for Cell A, and MKD for a given period (e.g., 9:00 to 10:00 o'clock) becomes bigger than or equal to (P1AvgW1WN–rollback_coefficient*P1StdevW1WN). In an example, rollback_coefficient can have the value of five (5).

The present system and method can be deployed using a cell MKD, or cell-based multiple KPI standard deviation from a calculated reference. Here the MKD can be used for best solution set evaluation and rollback decisions, if the solution set is directed to cell based configuration parameters. Cell based MKD can include KPI in the form of cells and relations. For relational KPI, aggregation from relations at the cell level can be performed. In some embodiments, each KPI has a "class" attached, for example, "important," "sustain," and "degrade." These classes have their respective weights where a KPI can also have a separate weighting within a class. Overall weight is indicated as multiplication of KpiWeight*ClassWeight.

In yet another aspect, the MKD can be relation-based on a multiple KPI standard deviation from a calculated reference. This MKD will be used for best solution set evaluation and rollback decisions, if the solution set includes relational configuration parameters. In an example, relation based MKD can include the following components during calculation of said deviations: relation based KPI changes from source cell to neighbor cell (Cell to Ncell); Cell based KPI changes in source cell (Cell); and Cell based KPI changes in neighbor cell (Ncell).

In yet another aspect of the present invention, inputs to MKD method are KPI metrics for cell based calculations. In an example, the following cell based metrics ERab%Retain, HoExe%SuccIntraF, Ho%RLF, CSSR, EthputUserDL, Ho%Osc, and/or HoExeAttIntraF and/or relational metrics, HoExe%SuccIntraF, HoExeAttIntraF, and/or Ho%RLF, may be used in the MKD method. ERab%Retain gives the ratio of normal call completions to all (normal and abnormal) call completions. HoExe%SuccIntraF gives ratio of successful handover events to all handover execution attempts within intrafrequency relations. Ho%RLF gives the ratio of radio link failures due to mobility problems to handover execution attempts. CSSR gives call setup completion success ratio.

EthputUserDL gives average user throughput in downlink experienced under the cell. Ho%Osc gives ratio of returned handovers within a predefined short period of time (namely ping pong handover) to all handover execution attempts. HoExeAttIntraF gives handover execution attempts for anintrafrequency relation of a cell. HoExe%SuccIntraF, HoExeAttIntraF and Ho%RLF may be calculated both on a cell aggregated or an individual cell relation level.

Figure 5:
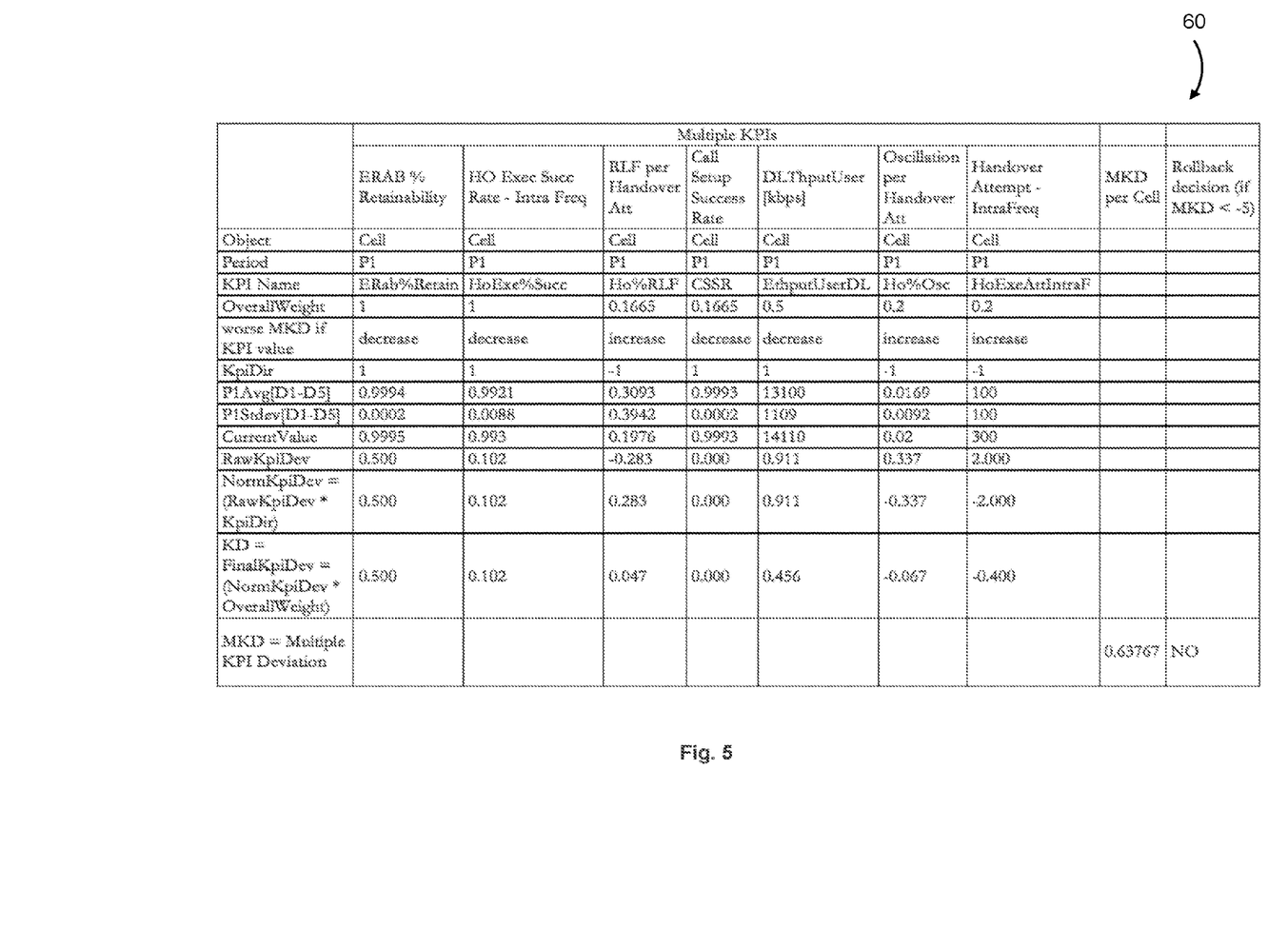
FIG. 5 illustrates exemplary table showing the system's use of multiple KPIs in a multi-KPI deviation (MKD) architecture.

In an example, a unified performance metric is calculated as a measure to assess how much standard deviation occurred in terms of said input KPIs in aggregate terms as given in a sample cell-based MKD Calculation illustrated in table 60 of FIG. 5.

OverallWeight gives desired weighting factor between KPIs which is predefined based on MCS. KPIDir is KPI direction which identifies the desired direction of change in terms of positive or negative. P1Avg[D1-D5] and P1Stdev [D1-D5] gives average and standard deviation calculations for corresponding KPIs during a baseline period. KPIs Current Values are collected from MCS. RawKPIDev is defined as (Current Value−P1Avg[D1-D5])/P1Stdev[D1-D5]. NormKpiDev and KD refers to (RawKpiDev*KpiDir) and (NormKpiDev*OverallWeight) respectively. MKD is the sum of all KD components, In the example below, ERab%Retain, HoExe%SuccIntraF, Ho%RLF, EthputUserDL contribute positively to overall MKD whereas Ho%Osc and HoExeAttIntraF contribute negatively due to increase in handover execution attempts and handover oscillation.

Output from the MKD processor has two main uses: (1) Performance gain measure (e.g. MKDmax) to select the best solution set and (2) Configuration revert-back decision, in case performance gain is below a specified threshold (e.g. MKDmin). Unexpected KPI dependencies may degrade system performance. Using KPI-based coefficients during KPI deviation aggregations, larger weights may be assigned to specific KPI based on field experience and preferences (e.g. Drop rate improvement, handover attempt increase/decrease, HO success rate improvement and/or degradation) whereas smaller weights may also be assigned to other KPIs of interest to get a measure of unexpected but loosely-coupled KPI deviations. (e.g., call setup success rate changes).

The present MKD method and system provides flexibility to inject a field knowledge base by allowing the assignment of coefficients to each KPI during this automatic assessment process. In this way, not only use-case specific KPIs are evaluated but also other KPIs may be considered in the assessment.

The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed upon review of the present disclosure. The claims are intended to cover such modifications and equivalents.

What is claimed is:

1. A computer-implemented method for improving the performance of a computerized Mobile Communication System (MCS) in a multi-cell network, comprising:
   in a computer comprising a processor, the computer in communication with the MCS:
   gathering baseline wireless communication signal data for a target area in which the method is to be carried out, including areas containing wireless communication cells or wireless communication cell relations for which wireless communication cell or wireless communication cell relation performance characteristics are to be extracted based on a plurality of key performance indicators (KPI), and storing baseline data in a computer-readable database;
   seeding the target area by applying a first solution set to a first wireless communication cell and a second solution set to a second wireless communication cell;
   measuring at least one performance metric for said first and second wireless communication cells;
   storing data representing said at least one performance metric for said first and second wireless communication cells in said database;
   calculating a unified performance metric for said first wireless communication cell and for said wireless communication second cell, the unified performance metric calculated by (a) calculating respective KPI standard deviation (KD) values for each of said at least one performance metric for said first wireless communication cell and for said second wireless communication cell and (b) calculating a multiple KD (MKD) value for said first wireless communication cell and for said second wireless communication cell, said MKD value comprising a sum of said respective KD values for said respective first or second wireless communication cells;
   identifying a maximum MKD value and a corresponding wireless communication cell;
   applying the configuration parameter settings of the corresponding cell to the other wireless communication cell; and
   generating cellular signals from a respective base station in the first and second wireless communication cells using the configuration parameter settings of the corresponding wireless communication cell.

2. The method of claim 1, further comprising:
   identifying a minimum MKD value and a second corresponding wireless communication cell;
   rolling back settings on the second corresponding wireless communication cell to a baseline configuration parameter settings if said minimum MKD value is less than a predetermined minimum value; and
   generating cellular communication signals from a base station in the second corresponding wireless communication cell using the baseline configuration parameter settings.

3. The method of claim 1, further comprising iteratively and automatically repeating said method on a periodic basis.

4. A computer system that improves the performance of a Mobile Communication System (MCS) in a multi-cell network, comprising:
   a processor of said computer system, in communication with the MCS:
   a wireless communication signal receiver that gathers baseline wireless communication signal data for a target area, disposed in areas containing wireless communication cells or wireless communication cell relations of said MCS for which wireless communication cell or wireless communication cell relation performance characteristics are to be extracted based on a plurality of key performance indicators (KPI);
   a computer-readable database, in data communication with said processor, that stores baseline data received by said receiver;

a solution engine implemented in said processor and configured and arranged to execute instructions that seed the target area by applying a first configuration parameter settings to a first wireless communication cell and a second configuration parameter settings to a second wireless communication cell;

said computer system further configured and arranged to detect at least one performance metric for said first and second wireless communication cells using said wireless communication signal receiver;

said computer system further configured and arranged to store data representing said at least one performance metric for said first and second wireless communication cells in said database;

said processor configured and arranged to calculate a unified performance metric for said first wireless communication cell and for said wireless communication second cell, the unified performance metric calculated by (a) calculating respective KPI standard deviation (KD) values for each of said at least one performance metric for said first wireless communication cell and for said second wireless communication cell and (b) calculating a multiple KD (MKD) value for said first wireless communication cell and for said second wireless communication cell, said MKD value comprising a sum of said respective KD values for said respective first or second wireless communication cells;

said processor configured and arranged to identify a maximum MKD value and a corresponding wireless communication cell;

said processor configured and arranged to apply the configuration parameter settings of the corresponding cell to the other wireless communication cell; and said processor configured and arranged to generate cellular signals from a respective base station in the first and second wireless communication cells using the configuration parameter settings of the corresponding wireless communication cell.

* * * * *